(12) United States Patent
Lettmann et al.

(10) Patent No.: US 9,828,889 B2
(45) Date of Patent: *Nov. 28, 2017

(54) CAMSHAFT AND CORRESPONDING PRODUCTION METHOD

(75) Inventors: Markus Lettmann, Kieselbronn (DE); Ralf Rieger, Tamm (DE); Falk Schneider, Korntal-Muenchingen (DE); Lutz Grunwald, Wustermark (DE); Antonio Menonna, Ditzingen (DE); Stefan Steichele, Gerlingen (DE)

(73) Assignee: Mahle International GmbH (DE)

( * ) Notice: Subject to any disclaimer, the term of this patent is extended or adjusted under 35 U.S.C. 154(b) by 181 days.

This patent is subject to a terminal disclaimer.

(21) Appl. No.: 14/234,057

(22) PCT Filed: Jul. 18, 2012

(86) PCT No.: PCT/EP2012/064111
§ 371 (c)(1),
(2), (4) Date: Apr. 21, 2014

(87) PCT Pub. No.: WO2013/011064
PCT Pub. Date: Jan. 24, 2013

(65) Prior Publication Data
US 2014/0238321 A1    Aug. 28, 2014

(30) Foreign Application Priority Data

Jul. 21, 2011  (DE) .................. 10 2011 079 582
Nov. 24, 2011  (DE) .................. 10 2011 087 049
Feb. 15, 2012  (DE) .................. 10 2012 202 301

(51) Int. Cl.
*F01L 1/04*      (2006.01)
*B23P 11/02*     (2006.01)
(Continued)

(52) U.S. Cl.
CPC .............. *F01L 1/04* (2013.01); *B21D 53/845* (2013.01); *B23P 11/025* (2013.01); *F01L 1/047* (2013.01);
(Continued)

(58) Field of Classification Search
CPC  F01L 1/047; F01L 1/04; F16H 53/025; B23P 2700/02; Y10T 29/49293
(Continued)

(56) References Cited

U.S. PATENT DOCUMENTS 4,616,389 A  * 10/1986  Slee .................. B23P 11/025
                                              29/447
5,272,930 A  * 12/1993  Nakamura .......... B21D 53/845
                                              29/888.1
(Continued)

FOREIGN PATENT DOCUMENTS

DE        3431361 A1    3/1986
DE    102006001769 A1    7/2007
(Continued)

OTHER PUBLICATIONS

English abstract for JP-2000-45717.
(Continued)

*Primary Examiner* — Ching Chang
(74) *Attorney, Agent, or Firm* — Fishman Stewart PLLC

(57) ABSTRACT

A camshaft for an internal combustion engine may include a shaft and at least one component that is joined to said shaft. The component may be connected via a joint surface of the component to a joint surface of the shaft. At least one of the joint surface of the component and the joint surface of the shaft may have a predefined roughness only partially on load-critical regions.

19 Claims, 3 Drawing Sheets

(51) Int. Cl.
    *F01L 1/047* (2006.01)
    *F16H 53/02* (2006.01)
    *B21D 53/84* (2006.01)

(52) U.S. Cl.
    CPC ........ *F16H 53/025* (2013.01); *B23P 2700/02* (2013.01); *Y10T 29/49293* (2015.01)

(58) Field of Classification Search
    USPC .............................................. 123/90.6, 90.16
    See application file for complete search history.

(56) References Cited

U.S. PATENT DOCUMENTS

| | | | | |
|---|---|---|---|---|
| 5,455,078 | A | * | 10/1995 | Kanzaki ................... B24C 3/32 427/328 |
| 5,826,491 | A | * | 10/1998 | Steiger .................. F04B 39/045 267/161 |
| 9,222,374 | B2 | * | 12/2015 | Menonna ................ F01L 1/047 |
| 9,249,692 | B2 | * | 2/2016 | Menonna ............. B23P 11/025 |
| 2007/0234988 | A1 | | 10/2007 | Kobus et al. |
| 2010/0058888 | A1 | | 3/2010 | Mueller et al. |
| 2010/0059002 | A1 | | 3/2010 | Drouillard |

FOREIGN PATENT DOCUMENTS

| | | |
|---|---|---|
| DE | 102006012358 A1 | 9/2007 |
| DE | 102007023087 A1 | 3/2008 |
| DE | 102007018920 B3 | 8/2008 |
| DE | 102009018407 A1 | 10/2009 |
| DE | 102009018408 A1 | 10/2009 |
| DE | 102008046167 A1 | 3/2010 |
| DE | 102009060352 A1 | 6/2011 |
| JP | 2000-045717 A | 2/2000 |
| JP | 2002-257149 A | 9/2002 |
| WO | WO-01/98020 A1 | 12/2001 |

OTHER PUBLICATIONS

English abstract DE-102009060352.
English abstract DE-102009018408.
English abstract DE-102008046167.
English abstract DE-102007023087.
English abstract DE-102006001769.
English abstract DE-3431361.
English abstract for JP 2002257149.

* cited by examiner

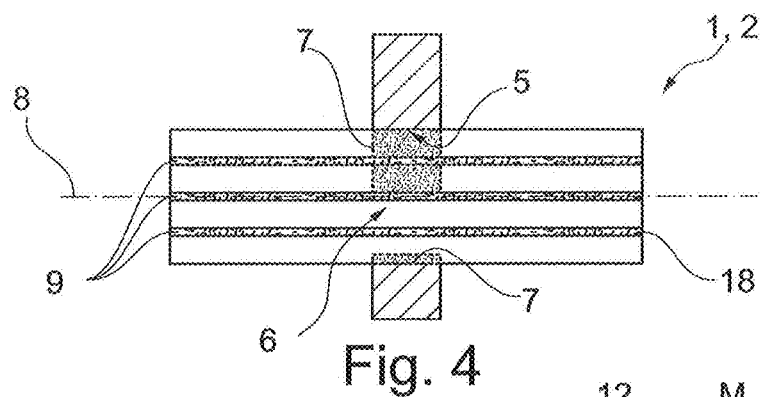
Fig. 4
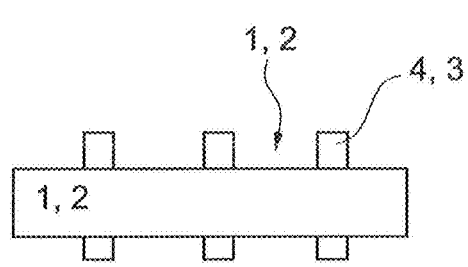
Fig. 5a.)
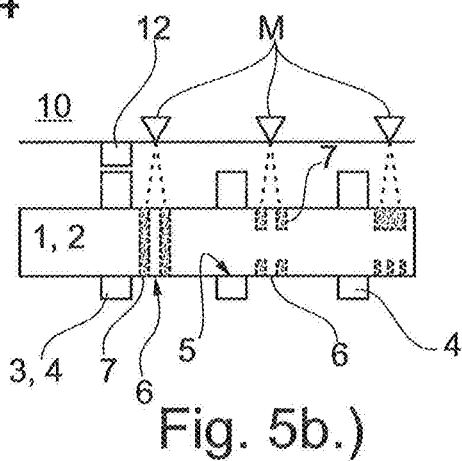
Fig. 5b.)
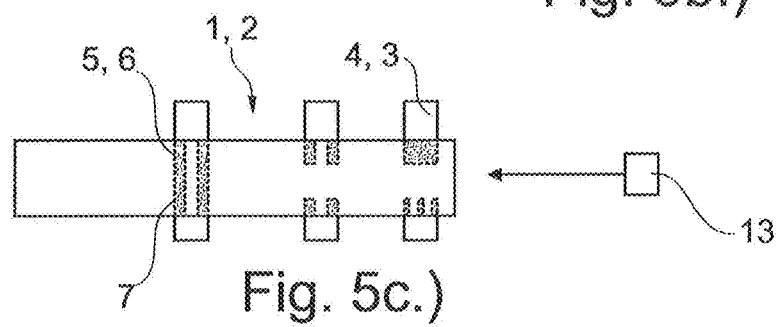
Fig. 5c.)
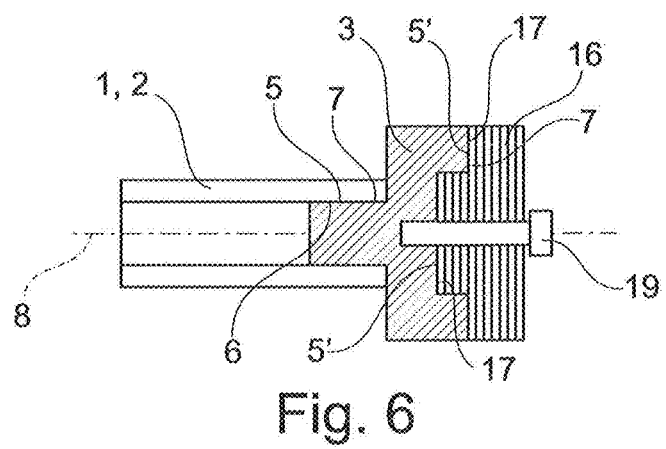
Fig. 6

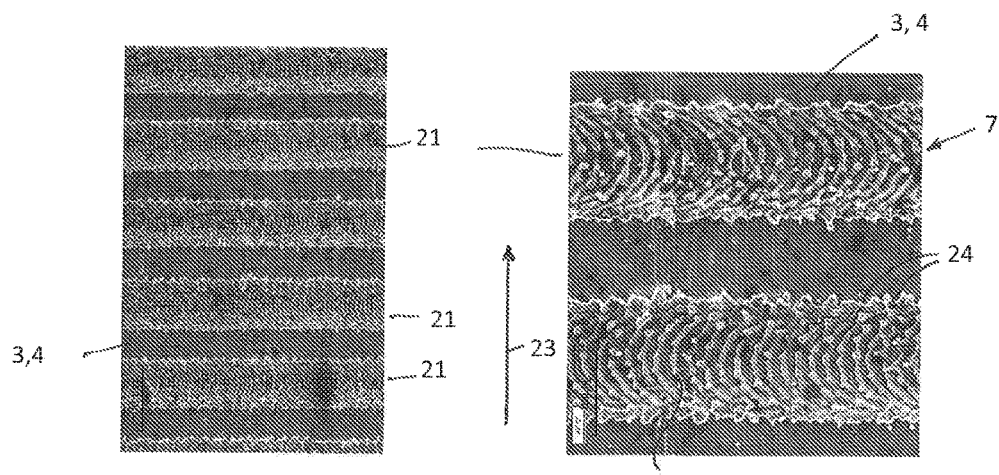
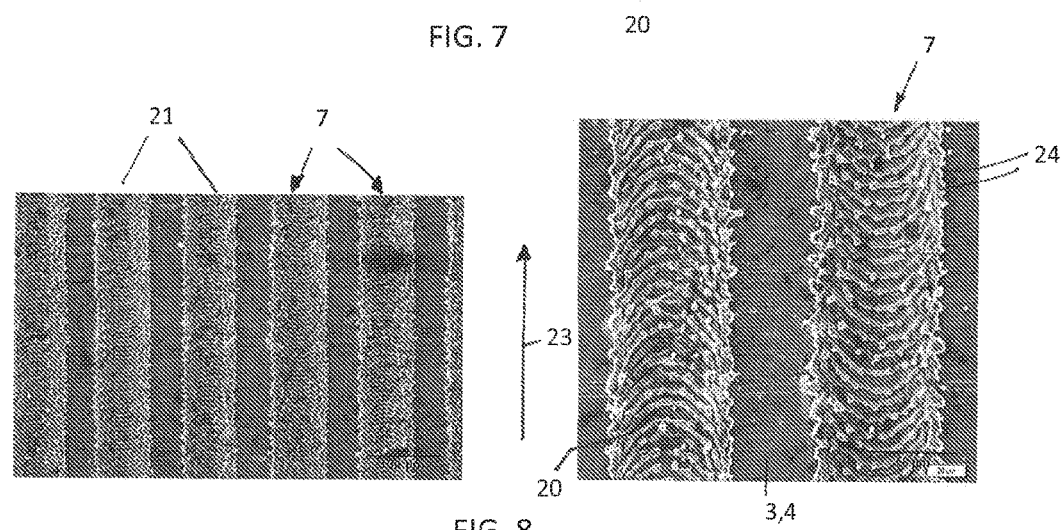
FIG. 7
FIG. 8
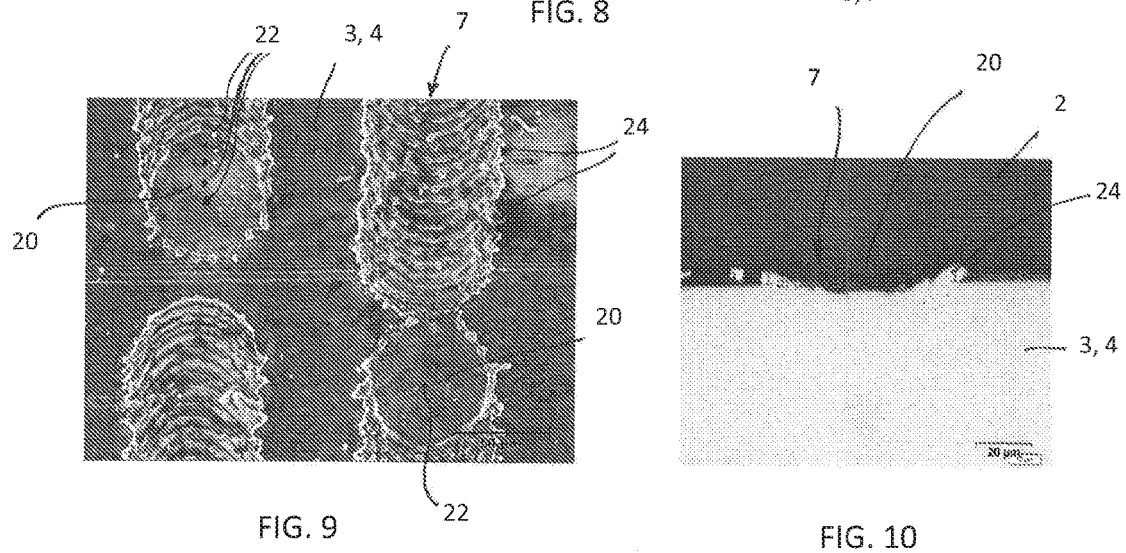
FIG. 9
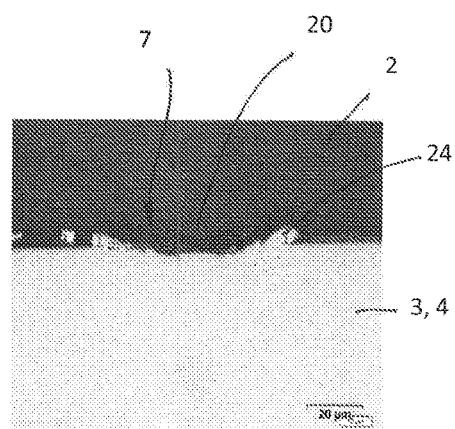
FIG. 10

CAMSHAFT AND CORRESPONDING PRODUCTION METHOD

CROSS-REFERENCE TO RELATED APPLICATIONS

This application claims priority to International Application No. PCT/EP2012/064111, filed Jul. 18, 2012, German Patent Application No. 10 2011 079 582.0, filed Jul. 21, 2011, German Patent Application No. 10 2011 087 049.0, filed Nov. 24, 2011, and German Patent Application No. 10 2012 202 301.1, filed Feb. 15, 2012, the contents of which are hereby incorporated in their entirety.

TECHNICAL FIELD

The present invention relates to a camshaft according to the preamble of the claim 1, and to a cam for such a camshaft. The invention further relates to a device and a method for producing such a camshaft and such a cam.

BACKGROUND

Camshafts are an integral part of internal combustion engines. The camshaft comprises an (idle) shaft onto which at least one cam is joined. For joining the shaft and the cam, normally, thermal joining process are used. Here, the connection of the shaft and the cam is ensured via a joint surface of the cam, which normally is arranged in a cam bore, and a joint surface of the shaft. The advantage here is that the torque that can be transmitted via the camshaft is limited by the friction between the joint surface of the cam and the joint surface of the shaft.

From DE 10 2009 060 352 A1, a method is known for producing a camshaft for valve timing of an internal combustion engine, comprising the following steps: Aligning a plurality of disc-like cams, each having a central round opening extending perpendicular to a cam main plane in such a manner that the openings of the cams arranged axially spaced apart from each other are aligned with each other; undercooling an idle shaft having a round outer profile relative to the cam, wherein the outer diameter of the undercooled idle shaft is smaller than, and the outer diameter of the non-undercooled idle shaft is larger than, the inner diameter of the cam openings; inserting the undercooled idle shaft into the aligned cam openings; inducing a temperature equalization between the idle shaft and the cam so that the idle shaft and the cams are fixedly connected to form a camshaft, wherein the inner surfaces of the cam openings and/or the outer surface of the idle shaft, in their inserted state, have a rough pattern on the portions surrounded by the cam opening, which rough pattern is generated by means of laser ablation.

SUMMARY

The present invention is in particular concerned with the problem to propose for a generic camshaft an improved or at least alternative embodiment which is in particular characterized by lower production costs.

This problem is solved according to the invention by the subject matters of the independent claims. Advantageous embodiments are subject matter of the dependent claims.

The present invention is based on the general idea to support a connection between a component and a camshaft, for example, a connection between a cam and the cam shaft, besides through, in particular, thermal joining, in addition also by partially roughening a joint surface of the component and/or a joint surface of the shaft. According to the invention, the joint surface of the component and/or the joint surface of the shaft are only roughened on load-critical regions or have a predefined roughness thereon which, moreover, can be implemented by means of a laser. Of course, as an alternative to lasering, shot peening or chemically treating the respective region to be roughened is also conceivable. By only partially roughening the joint surface of the component and/or the joint surface of the shaft on each of the load-critical regions, the efforts for roughening and therefore the cycle time can be considerably reduced and thereby, in turn, assembling the camshaft can be accelerated. The reduction of the cycle time is in particular based on the fact that now the entire joint surface has no longer to be roughened, i.e., for example, lasered, but only partial surfaces of the joint surface(s) are roughened, as a result of which the roughening process per se can be streamlined and thereby, in turn, the cycle time can be shortened. Of course, as an alternative to the cam, the component joined to the camshaft can also be formed as a signal generator wheel, as a plug, as a gearwheel, as a drive element or output element, as a tool interface, as an adjusting element, as an aligning element, as an assembly aid element, as a bearing ring or as a sleeve. Likewise, it is conceivable that such an aforementioned component is joined to a general shaft without this shaft being specifically formed as a camshaft. It therefore applies to the entire patent application that the term "camshaft" can always be replaced by the term "shaft" and the term "cam" can always be replaced or generalized by the term "component".

In an advantageous refinement of the solution according to the invention, the predefined roughness is ca. 2-25 Rz. Through an exact setting of the roughness, the exact setting of a transmittable torque is also possible. At the same time, due to the roughening, the holding time at temperature of the heated cam and therefore also the cycle time can be reduced.

Advantageously, the component is formed as a cam and, at the same time, the joint surface of the cam and/or the joint surface of the shaft are roughened in the region of the associated cam elevation region and/or the opposing base circle, wherein the roughness in the region of the cam elevation extends over a circumferential angle of ca. 20-140° and in the opposing region over a circumferential angle of ca. 20-140°. In particular in the region of the cam elevation, that is, in the region of the cam tip and/or the opposing base circle, an increased normal force is to be expected so that applying a predefined roughness on exactly these places reliably ensures high torque transmission.

In an additional or alternative embodiment it can be provided that the joint surface of the camshaft and/or the joint surface of the shaft are/is roughened in a ring-shaped manner at least partially, preferably over the full circumference, on two axial edges that are spaced apart from each other. Thus, in this case, only the respective edge region of the joint faces of the component and/or the shaft is roughened, that is, in particular lasered, wherein precisely in these regions the highest contact pressures occur and thereby, in turn, high normal forces result in transmission of high torques. Due to the merely partial roughening, the roughening process per se can take place significantly faster, whereby, in turn, a reduction of the cycle time is possible. Of course, it is also possible that many different regions of the respective joint surfaces have many different roughness values, wherein, furthermore, it is conceivable that a degree of the predefined roughness is adapted to a respective degree of load in the region of this surface so that in regions of higher loads, a higher roughness is provided.

Advantageously, the partial roughness incorporated by means of laser has machining tracks that are aligned parallel, transverse or diagonal to the camshaft axis. In particular in the case of a parallel alignment of the machining tracks of the predefined roughness with regard to the camshaft axis, sliding onto the machining tracks that are now roughened and, at the same time, also hardened by the laser beam is made easier, wherein, at the same time, the use of a camshaft blank, that is, an unmachined camshaft, or a shaft in general, is also conceivable. Despite the easier joining in the axial direction, it is possible in this manner to transmit high torques between the cam and the shaft since during the torque transmission, the loading direction changes. By lasering, a comparatively hard grain structure can be achieved in the region of the roughness, which, in particular in the case of softer components or shafts, results in a harder surface structure which, in turn, is designed for transmitting higher torques. Hardening the surface structure can additionally be supported by a comparatively fast cooling after lasering.

By a defined laser power, a defined roughness and thereby a defined transmittable torque can be generated. In addition to varying or influencing the laser power, repeated lasering of a machining track or a machining region is conceivable, whereby the desired hardness can be set in a particularly precise manner. Via said machining tracks, it is principally also possible to generate machining patterns, for example, checks, rhombuses, rectangular patterns etc.

In an advantageous refinement of the solution according to the invention, the components are connected to the camshaft by means of a press fit and/or by means of a thermally joined fit, wherein in the latter case, the cams are heated. In the case of conventional thermally joined fits, usually, the shaft is cooled and/or the cam or the component is heated. However, in the present case, only the components, that is, in this specific case, the cams, are heated and then slid over the associated shaft or camshaft. Of course, it is also conceivable to use only a press fit without thermal pre-treatment.

The present invention is further based on the general idea to propose a device for producing a cam shaft comprising a shaft and at least one cam that is, in particular, thermally joined thereto, wherein the cam is connected via a joint surface of the cam to the joint surface of the shaft. The device according to the invention has a feed unit for displacing the shaft, and a holding and heating device for heating the cam and for fixing the cam during the assembly process. In addition, a laser is provided for incorporating the partial roughness in the joint surface of the cam and/or the joint surface of the shaft immediately prior to sliding on the cams. It is conceivable here, for example, that the shaft is displaced by slightly more than a joint width, that is, in the present case, by slightly more than a cam width, wherein beforehand, all components, and in particular cams, were threaded onto the camshaft. Then, all joining positions on the shaft, that is, all joint surfaces of the shaft, are lasered and subsequently, the cams are slid onto the joint surfaces on the shaft or vice versa. Through this, it can be avoided that the cams unintentionally move over further joint surfaces of the shaft.

Further important features and advantages of the invention arise from the sub-claims, from the drawings, and from the associated description of the figures based on the drawings.

It is to be understood that the above-mentioned features and the features still to be explained hereinafter are usable not only in the respective mentioned combination, but also in other combinations or alone, without departing from the context of the present invention.

Preferred exemplary embodiments of the invention are illustrated in the drawings and are explained in more detail in the following description, wherein identical reference numbers refer to identical, or similar, or functionally identical components.

BRIEF DESCRIPTION OF THE DRAWINGS

In the figures, schematically:

FIG. 4 shows a view on a camshaft according to the invention with longitudinal machining tracks for sliding the cams and for torque transmission, FIG. 5a-5c shows different method steps for producing the camshaft according to the invention, FIG. 6 shows a further possible field of use of the invention, FIG. 7 shows a roughness incorporated by means of a laser, said roughness being composed of individual laser points, wherein the centers of the individual laser points are arranged offset to each other, and the individual laser points are arranged overlapping each other, FIG. 8 shows an illustration as in FIG. 8, but with a rotational direction running parallel to the tracks, FIG. 9 shows a microscopic detailed illustration of a further possible embodiment of the tracks of FIG. 8, FIG. 10 shows a microscopic sectional view through a laser point of the roughness.

DETAILED DESCRIPTION

Figure 1:
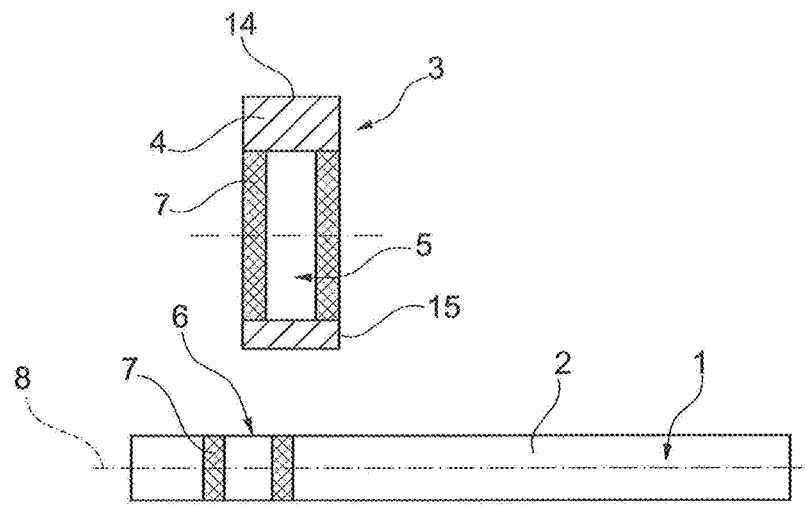
FIG. 1 shows a camshaft according to the invention and an associated cam with a predefined roughness that is incorporated in a ring-shaped manner at two axial edges that are spaced apart from each other.
Figure 2:
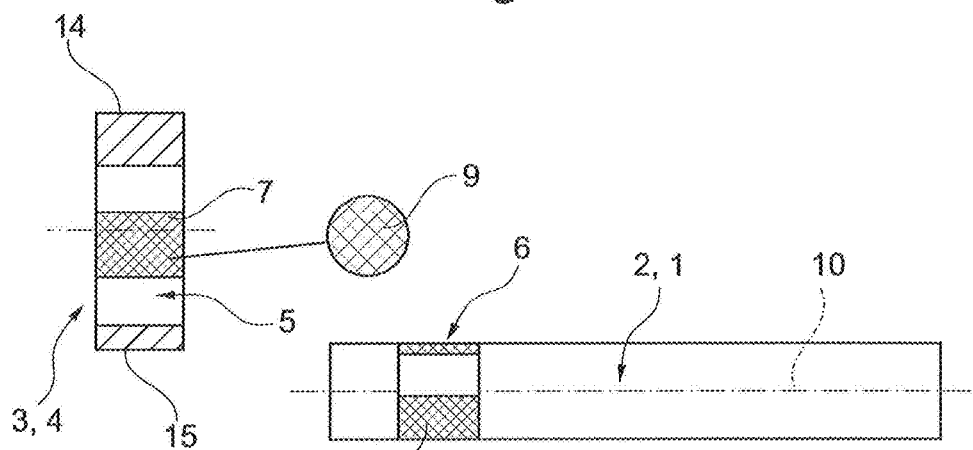
FIG. 2 shows an illustration similar to FIG. 1, but with a differently arranged partial roughness, FIG. 3 in turn, shows many different possible embodiments of the roughness that increases the capability of torque transmission.

According to the FIGS. 1 and 2, a camshaft 1 according to the invention for an internal combustion engine, which is not shown here, comprises a shaft 2 and at least one component 3, here a cam 4, that is in particular thermally joined to said shaft and can be connected to a joint surface 6 of the shaft via a joint face 5 of the component. According to the invention, the joint surface 5 of the component and/or the guide surface 7 of the shaft have a predefined roughness 7 only partially on load-critical regions, that is, for example, in the region of a cam elevation region or an opposing base circle, which roughness is incorporated in particular by means of a laser. The predefined roughness 7 can range between 2 and 25 Rz.

In general, the component 3 can be formed, as in the present case, as a cam 4, wherein it is of course also conceivable that it is formed, for example, as a signal generator wheel, as a plug, as a bearing ring, as a chain/belt wheel, as a gearwheel, as a drive element or output element, as a tool interface, as an adjusting element, as an aligning element, as an assembly aid element, or as a sleeve. The joint surface 5 of the camshaft and/or the joint surface 6 of the shaft are preferably roughened, as previously mentioned, in the region of the associated cam elevation, that is, of a cam tip, and/or of the opposing base circle, wherein the roughness 7 extends in the region of the cam elevation over a circumferential angle of ca. 20-140°, preferably of ca. 50-120°, and in the opposing region of the base circle over a circumferential angle of ca. 20-140°, preferably of ca. 20-90°.

Figure 3:
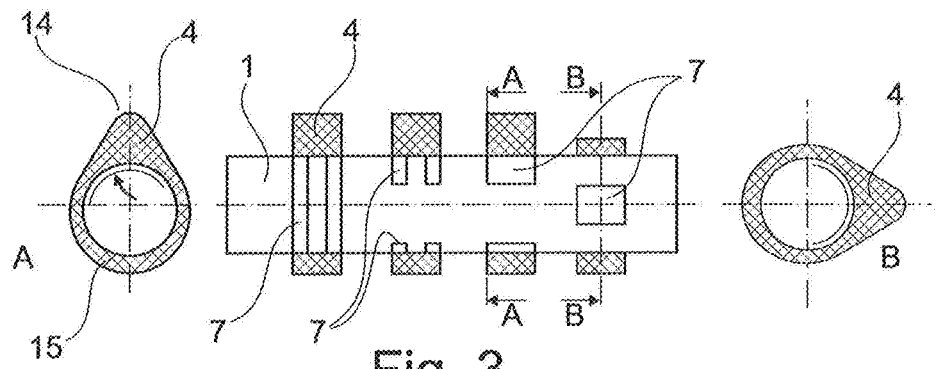

When viewing the joint surfaces 5 and 6 according to FIG. 1, it can be seen that they are roughened circumferentially in a ring-shaped manner at two axial edges that are spaced apart from each other. Alternatively, it is also possible, of course, that a roughness 7 is provided that extends over the entire axial width of the cam 4, as illustrated, for example, according to the FIGS. 2 and 3. However, in this case, not the entire joint surface 5 or 6 is roughened, but merely a certain region thereof. When viewing, for example, FIG. 3, it can be seen that the roughness 7 in the leftmost illustration is formed in a ring-shaped manner, as in FIG. 1, wherein according to the second illustration in FIG. 3, these rings are interrupted in the region of an equator.

Connecting the cams 4 to the camshaft 1 or, in general, the components 3 to the shaft 2 can be carried out via a simple press fit or a thermally joined fit, wherein in this case the cams 4, that is, the components 3 are heated beforehand. Roughing, for example, only in the axial edge region has the advantage that in said region, the highest contact pressures occur, which are also caused, for example, by tilting, and therefore the highest torques are transmitted in these edge regions. All shafts 2 or camshafts 1 used can be finish-machined or unmachined.

When viewing the FIG. 4, machining tracks 9 can be seen which are roughened parallel to the camshaft axis 8 and on which the cams 4 are slid along. Nevertheless, the joint surface 6 of the shaft and/or the joint surface 5 of the component are additionally provided with a predefined roughness 7 that is needed for transmitting the torques. According to FIG. 4, the machining tracks 9 run parallel to the camshaft axis 8, wherein, of course, the machining tracks 9 can also run diagonal thereto, or the roughness 7 has in the region of the joint surfaces 5, 6 corresponding machining tracks 9 that run parallel, transverse or diagonal to the camshaft axis 8. Furthermore, the machining tracks 9 can also be formed as sliding tracks 18 and, moreover, can serve as an oil reservoir. Here, a half-shaft, that is, in particular a non-ground or unmachined shaft can be used. Also, on the joint surface 5 of the component and/or on the joint surface 7 of the shaft, axially parallel machining tracks can be incorporated so as to make assembly easier. Sliding the cam 4 onto the camshaft 1 is carried out in this case by means of pressing force, wherein, however, the roughnesses 7 in the region of the later joint surfaces 5, 6 ensure torque transmission.

In general, the component 3 can be formed as a cam 4 and can comprise a joint face 5 that is turned on the inside and is formed as a cam seat that is overlaid with the roughness 7 in the form of laser structures. Turned inner cam seats have turning tracks (turning pass) that are oriented in the circumferential direction and have a depth, width, etc. that can be adjusted within certain limits. If in such a basic structure, which is produced by machining, an additional laser structure with strips/machining tracks 9 is incorporated transverse (angle 0 . . . 90° relative to the turning pass) to the turning pass, checks/rhombuses/rectangular patterns having many profile peaks (cf. detail in FIG. 2) are created. Here, an angle to the turning pass, a distance between the machining tracks 9 and a depth thereof can be varied. In general, when assembling the cam 4, such a profile enables a considerably improved torque transmission. Since the actual contact area decreases, the surface pressure of the press fit increases. The pointed structures "interlock" better with the roughness 7 of the camshaft surface.

When viewing the FIG. 6 it can be seen that a structural element 16 is connected to the component 3, wherein joint surfaces 5' of the component are arranged on the component 3, and/or joint surfaces 17 of the structural element are arranged on the structural element 16, which joint surfaces contact each other at the structural element 16 connected to the component 3, and wherein the joint surface 5' of the component and/or the joint surface 17 of the structural element have/has a predefined roughness at least or only partially on load-critical regions. The structural element 16 and the component 3 can be connected to each other via a screw connection 19. The joint surfaces 5, 5' of the component and/or the joint surface 6 of the shaft and/or the joint surface 17 of the structural element can be arranged on the front side or on the circumference of the respective component 2, 3, 16.

FIGS. 5*a-c* principally illustrate the method for assembling the cams 4 on the associated camshaft 1: At first, in the first method step, that is, according to FIG. 5*a*, the cams 4 are slid onto the camshaft 1 or, in general, onto the shaft 2, or is heated beforehand for this purpose by means of a holding and heating device 12 (cf. FIG. 5*b*). In the method step according to FIG. 5*b*, the predefined roughness 7 is then incorporated in the region of the later joint surface 6 of the shaft by means of a laser 11 that is arranged in a corresponding device 10 for producing the camshaft 1. In the method step according to FIG. 5*c*, the camshaft 1 or, in general, the shaft 2 is subsequently displaced by means of a feed unit 13 in such a manner that the cams 4 or, in general, the components 3 are positioned with their joint surfaces 5 of the component over the joint surfaces 6 of the shaft.

In general, the roughness 7 can be arranged on one or on both friction partners, that is, on both the component 3 and the shaft 2, wherein it is conceivable that identical or different roughnesses 7 are incorporated. This can be carried out, for example, by lasers having different laser power, or by different chemical treatment methods or different shot peening methods, for example with different shot peening materials such as, for example, steel, glass or corundum.

However, by means of the laser 11 that generates the roughness 7 it is not only possible to apply said roughness, but, in general, the shaft 2 or, respectively, the camshaft 1 can also be cleaned. Lasering generates a micro-hardness which, in particular in the case of softer shafts 2 or components 3, effects a harder surface structure by means of which, in turn, a higher torque can be transmitted. The higher micro-hardness can be facilitated, for example, by rapid cooling.

In general, the component 3, in particular the cam 4, can be formed from a metal with a carbon content of at least 0.6% by weight, whereas the shaft 2 has a lower carbon content. Considered as a material for the cam 4 or, in general, the component 3 can be in particular steels that are well suited for hardening such as, for example, 100Cr6, C60, C45, or sinter materials such as, e.g., A1100, 1200, 1300, 1500, or casting materials such as EN GJL 250 or EN GJS 700. In general, air-hardened steels can also be used for the components 3. However, for the shaft 2, in particular low-carbon steels such as E335 and C60E can be taken into consideration.

In order to be able to increase the torque transmission capability, the joint surface 5, 5' of the component and/or the joint surface 17 of the component can have a roughness 7 that is incorporated and hardened by means of a laser 11 and which comprises in particular a plurality of tracks 21 composed of individual laser points 20, wherein the centers 22 of the individual laser points 20 are arranged offset to each other, and the individual laser points 20 are arranged overlapping each other, as illustrated according to the FIGS. 7 to 9. Of course, it is also conceivable that the joint surface 6 of the shaft has such a roughness 7 that is incorporated and hardened by means of a laser 11, wherein in this case, the shaft 2 is hardened prior to incorporating the roughness 7 by means of the laser 11.

In FIG. 7, a twisting direction 23 of the shaft 2 runs orthogonal to the direction of the tracks 21, wherein in this case, in particular the edges/corners 24 of the tracks 21 influence the maximally possible twisting moments. In contrast to this, the twisting direction 23 of the shaft 2 in FIG. 8 runs parallel to the direction of the tracks 21, whereby an even greater resistance against slipping and therefore a greater torque transmission capability can be achieved. The torque transmission capability and therefore the resistance against slipping between the shaft 2 and the component 3 are influenced here by an edge 24 (cf. FIGS. 7-10) raised during laser puncturing, which edge is usually arranged on the component 3 or on the cam 4 and is embedded in the shaft 2 during joining to said shaft. Embedding is possible due to the material of the shaft 2 that is softer compared to the material of the component 3.

In the FIGS. 7-10, the roughness 7, for example the laser points 20, are always incorporated in the component 3 or, respectively, the cam 4, wherein, of course, laser puncturing the shaft 2 and therefore generating edges 24 on the shaft 2 is also conceivable, wherein for this, the shaft 2 has first to be subjected to carburization so that the shaft can subsequently be hardened during the laser puncturing. This has in particular the advantage that only a single component, namely the shaft 2, has to be machined rather than a multiplicity of components 3 or cams 4. In general, in the case of laser puncturing and prior carburization of the shaft 2, a torque can be increased from ca. 135 to 225 Nm, and in the case of laser puncturing the component 3, it can even be increased to 325 Nm, which corresponds to an increase of more than 100%. A twisting moment is to be understood here as that moment at which the component 3 starts to slip on the shaft 2.

Laser structuring the cam seat (on the shaft and/or on the cam) is currently probably the best method for the future in order to achieve significant increases of the twisting moment of cams 4 that are thermally joined to the shaft 2. During further examinations, the focus was on improving the efficiency while increasing the twisting moment at the same time. It was found that a higher twisting moment can be achieved if only the cam 4 is structured by means of a laser 11. If the shaft 2 is structured and the cam 4 is not structured, a twisting moment is achieved that is higher compared the previous purely thermal joining; however, the twisting moment that can be achieved is not as high as in the case of laser structuring the cam 4. This is due to the used material combination cam/shaft. As a material for the cams 4, high-carbon steel (e.g. C60 or 100Cr6) should be used since due to the higher carbon content, this steel is better suited for hardening than the steel E335 used for the shaft 2. During laser structuring, a high amount of energy is locally introduced, which results in a micro-hardness exactly in the region of the raised structures, that is, in particular of the edges 24. For this reason, the edges 24 (bulges) of the cam 4 resulting from structuring embed deeper into the shaft 2 than it would be in the reverse case.

Furthermore, it became apparent that individual laser points 20, or laser points 20 that partially overlap each other (cf. FIGS. 7-9), also result in an increase of the twisting moment since hereby, compared to a continuous "laser track", more barb structures can be formed on the surface, which then can be embedded in the counter surface.

The invention claimed is:

1. A camshaft for an internal combustion engine, comprising: a shaft having an outer joint surface and at least one component with an inner joint surface that is joined to said shaft, the at least one component is connected via the inner joint surface of the at least one component to the outer joint surface of the shaft, wherein at least one of the inner joint surface of the at least one component and the outer joint surface of the shaft has a predefined roughness over a circumferential angle of ca. 20 to 140° in a region of a cam tip of an associated cam elevation,
wherein the predefined roughness in the region of the associated cam elevation extends over the circumferential angle of ca. 20 to 140° and further in an opposing region over the circumferential angle of ca. 20 to 140°, thereby providing an increased normal force for higher torque transmission.

2. The camshaft according to claim 1, wherein the predefined roughness is incorporated by way of at least one of a laser, mechanically, or by a chemical method.

3. The camshaft according to claim 2 wherein the predefined roughness has machining tracks that are aligned at least one of parallel, transverse or diagonal to a camshaft axis of the shaft, and the inner joint surface of the at least one component and the outer joint surface of the shaft have a different roughness.

4. The camshaft according to claim 3, wherein the machining tracks form a machining pattern and the individual machining tracks are arranged at an angle of 0-90° relative to the camshaft axis.

5. The camshaft according to claim 4, wherein the machining pattern includes at least one of a checked pattern, a rhomboid pattern, and a rectangular pattern.

6. The camshaft according to claim 1, wherein the at least one component is formed as at least one of a cam, a signal generator wheel, a chain/belt wheel, a plug, a gearwheel, a drive element or output element, a tool interface, an adjusting element, an aligning element, an assembly aid element, a bearing ring, and a sleeve.

7. The camshaft according to claim 6, wherein at least one of the outer and inner joint surfaces is roughened in a ring-shaped manner at least partially at two axial edges that are spaced apart from each other.

8. The camshaft according to claim 1, wherein the at least one component is connected to the shaft by at least one of a press fit and a thermally joined fit, wherein the at least one component includes cams that are heated for the thermally joined fit.

9. The camshaft according to claim 1, further comprising a structural element connected to the at least one component and including a third joint surface having the predefined roughness.

10. The camshaft according to claim 9, wherein the structural element and the at least one component are connected to each other via a screw connection.

11. The camshaft according to claim 9, wherein the structural element is arranged on a front side of the at least one component.

12. The camshaft according to claim 9, wherein at least one of the at least one component is formed from a metal with a carbon content of at least 0.6% by weight, whereas the shaft has a lower carbon content, and at least one of the inner joint surface of the component, the third joint surface of the structural element, and the outer joint surface of the shaft have an initial roughness that is incorporated and hardened by a laser, wherein the shaft is hardened by the laser prior to incorporating the predefined roughness.

13. The camshaft according to claim 12, wherein the initial roughness incorporated and hardened by the laser comprises a track that is composed of individual laser points, wherein first and second centers of the individual laser points are arranged offset to each other, and the individual laser points are arranged overlapping each other, and the shaft is formed from E335 steel, and the components are formed from C60 or 100Cr6 steel.

14. The camshaft according to claim 1, wherein the inner joint surface has the predefined roughness incorporated by a laser.

15. The camshaft according to claim 1, further comprising axially parallel machining tracks formed as hardened sliding tracks incorporated in at least one of the outer and inner joint surfaces, and the at least one component includes a cam, and the inner joint surface is formed as a cam seat that is turned on an inside and which is overlaid with machining tracks formed as laser structures.

16. The camshaft according to claim 1, wherein at least one of the outer and inner joint surfaces is roughened in a ring-shaped manner at least partially at two axial edges that are spaced apart from each other.

17. The camshaft according to claim 1, wherein the predefined roughness is incorporated by the laser has machining tracks that are aligned at least one of parallel, transverse, or diagonal to a camshaft axis, and the outer joint surface and inner joint surface have a different roughness.

18. A device for producing a camshaft having a shaft with an outer joint surface and at least one cam with an inner joint surface that is joined to said shaft, said at least one cam is connected via the inner joint surface of the at least one cam to the outer joint surface of the shaft, comprising:
    a feed unit for displacing the shaft,
    a holding and heating device for heating the at least one cam and for fixing the at least one cam during assembly, and
    a laser for incorporating partial roughness over a circumferential angle of ca. 20 to 140° in at least one of the inner joint surface of the at least one cam and the outer joint surface of the shaft immediately prior to sliding on the at least one cam, the partial roughness being in a region of a cam tip of an associated cam elevation.

19. A method for producing a camshaft having a shaft with an outer joint surface and at least one cam with an inner joint surface that is joined to said shaft, said cam is connected via the inner joint surface of the at least one cam to the outer joint surface of the shaft, comprising:
    providing a feed unit that displaces the shaft,
    heating the at least one cam before assembly and fixing the at least one cam during assembly via a holding and heating device, and
    incorporating, via a laser, a partial roughness over a circumferential angle of ca. 20 to 140° in at least one of the inner joint surface of the at least one cam and the outer joint surface of the shaft immediately prior to sliding on the at least one cam, the partial roughness being in a region of a cam tip of an associated cam elevation.

* * * * *